United States Patent [19]

Tompkin et al.

[11] Patent Number: 5,760,961
[45] Date of Patent: Jun. 2, 1998

[54] OPTICAL INFORMATION CARRIER HAVING DIFFRACTIVE FEATURES AND DIFFRACTION MODULATION LAYERS

[75] Inventors: Wayne Robert Tompkin, Ennetbaden; René Staub, Cham, both of Switzerland

[73] Assignee: Landis & Gyr Technology Innovation AG, Zug, Switzerland

[21] Appl. No.: 613,860

[22] Filed: Mar. 11, 1996

[30] Foreign Application Priority Data

Mar. 16, 1995 [EP] European Pat. Off. ............ 95810177

[51] Int. Cl.⁶ .................. G02B 5/18; G03H 1/00; B42D 15/00
[52] U.S. Cl. .................. 359/576; 359/566; 359/2; 250/271; 283/86; 283/87; 283/91
[58] Field of Search .................. 340/825.34; 250/271; 235/457, 468; 283/85, 86, 87, 88, 89, 91; 359/2–10, 25, 28, 32, 558, 566, 576

[56] References Cited

U.S. PATENT DOCUMENTS

| | | | |
|---|---|---|---|
| 3,703,407 | 11/1972 | Hannan et al. | 359/3 |
| 4,576,439 | 3/1986 | Gale et al. | 283/91 |
| 4,856,857 | 8/1989 | Takeuchi et al. | 359/3 |
| 4,921,319 | 5/1990 | Mallik | 359/1 |
| 5,304,789 | 4/1994 | Lob et al. | 283/85 |
| 5,379,131 | 1/1995 | Yamazaki | 235/457 |
| 5,432,329 | 7/1995 | O'Boyle et al. | 359/2 |
| 5,522,623 | 6/1996 | Soules et al. | 283/91 |
| 5,629,068 | 5/1997 | Miekka et al. | 359/576 |

FOREIGN PATENT DOCUMENTS

| | | | |
|---|---|---|---|
| 0 201 323 B1 | 11/1986 | European Pat. Off. | G03H 1/02 |
| 0 264 277 A2 | 4/1988 | European Pat. Off. | G03H 1/02 |
| 0 570 120 A2 | 11/1993 | European Pat. Off. | G06K 19/16 |
| 32 33 197 A1 | 5/1983 | Germany | B44F 1/12 |
| A 06-110382 | 4/1994 | Japan | 359/2 |
| WO 91/06925 | 5/1991 | WIPO | G06K 19/02 |
| WO 92/04692 | 3/1992 | WIPO | 235/457 |
| WO 94/25288 | 11/1994 | WIPO | B42D 15/10 |

*Primary Examiner*—Paul M. Dzierzynski
*Assistant Examiner*—John Juba, Jr.
*Attorney, Agent, or Firm*—Meltzer, Lippe, Goldstein et al.

[57] ABSTRACT

An information carrier is in the form of a composite laminate with a first, a second and a third layer having refractive indices n3, n4, n5 respectively. The second layer forms structures by only partially covering the first layer. The third layer covers over the second layer or the first layer in direct contact therewith. The surface on the first layer has surface elements with first and second diffraction structures which produce a visually verifiable authenticity feature or which serve for reading out the information contained in the structures formed by the second layer. The refractive indices n4 and n5 are substantially real in the visible range and therefore the second and third layers are transparent. The differences |n4−n3| and |n5−n3| are greater than 0.2 over large parts of the visible range so that the first diffraction structures produce visible diffraction effects independently of the structures formed by the second layer. The differences n4−n3 and n5−n3 are of approximately equal magnitude in the visible range so that the structures formed by the second layer are invisible. In a second predetermined spectral range Λ, the absolute difference |n5−n4| is at least 0.1 so that in the reading operation using a suitable light beam the structures formed by the second layer produce a measurable change in the light beam which is diffracted at the second diffraction structure.

27 Claims, 2 Drawing Sheets

OPTICAL INFORMATION CARRIER HAVING DIFFRACTIVE FEATURES AND DIFFRACTION MODULATION LAYERS

BACKGROUND OF THE INVENTION

1. Field of the Invention

The invention relates generally to optical information carriers. The invention may be applied, for example, to information carriers of the kind which are in the form of a composite laminate having first, second and third layers wherein a surface of the first layer facing the second and third layers has diffraction structures in the form of microscopically fine relief structures.

Such optical information carriers with an optical diffraction structure are suitable for example for enhancing the safeguards against forgery and the conspicuous identification of articles of all kind and can be used in particular in relation to value-bearing papers or securities and bonds, passes, means of payment and similar articles to be safeguarded.

The diffraction structures are embossed in the form of relief structures into a first lacquer layer and covered with a second layer which is at least partially reflective or which generally has a refractive index that differs from the first layer. The diffraction structures cause diffraction of the light which is incident on the structure. The difference in respect of height of those relief structures is typically selected to be between 50 nm and 10.000 nm.

2. Description of the Prior Art

International patent application WO 91/06925 describes an information carrier having optically effective diffraction structures which are covered with a metallic layer. The diffraction structures produce a first image which serves as a visually perceptible authenticity feature. A second image which is not based on diffraction effects is printed directly onto the diffraction structures. The diffraction structures or the second image respectively are covered by a further layer so that the embedded second image is not accessible from the outside. The second image is visible for the naked eye even if materials are used which themselves are invisible in the visible range. It is also provided that only parts of the information carrier are covered with the metallic layer so that the information carrier appears partially transparent. A further optical information carrier is known from European patent application EP 264 277. European patent EP 201 323 B1 discloses a transparent hologram which can be applied to a document as an authenticity feature without covering over items of information which are present on the document and which are machine-readable or visible to the eye. The hologram which is in the form of surface relief may also be partially printed over with a print layer and covered by a further layer.

SUMMARY OF THE INVENTION

An object of the present invention is to propose an information carrier with machine-readable information which is concealed from the human eye and which is easy to produce, difficult to copy or forge and easy to read.

One aspect of the present invention provides an information carrier in the form of a composite laminate having at least a first, a second and a third layer, said first layer having a surface which faces towards said second and third layers and which has first diffraction structures which are in the form of microscopically fine relief structures and which, by diffraction of incident light, produce a visually verifiable authenticity feature, wherein:

a) said first, second and third layers have optical refractive indices n3, n4 and n5 respectively, b) said refractive indices n4 and n5 are substantially real over large parts of the visible range $\Gamma$ of the electromagnetic spectrum whereby said second and third layers are transparent, c) said second layer only partially covers said first layer to form layer structures, d) said third layer covers said layer structures in direct contact with said first and second layers, e) the absolute differences |n4−n3| and |n5−n3| over large parts of said visible range $\Gamma$ are greater than 0.2 so that said first diffraction structures produce visible diffraction effects independently of said layer structures, f) the differences n4−n3 and n5−n3 over large parts of the visible range $\Gamma$ are of approximately equal magnitude so that said layer structures remain concealed from the human eye, g) said surface of said first layer has second surface elements with a second diffraction structure, said second surface elements being separated by first surface elements with said first diffraction structures, and h) the absolute difference |n5−n4| in a second predetermined spectral range $\Lambda$ is at least 0.1 so that, in an operation of reading the information carrier by means of a reading light beam in the spectral range $\Lambda$, said layer structures produce a measurable change in the reading light beam which is diffracted at said second surface elements with said second diffraction structure.

Another aspect of the present invention provides an information carrier in the form of a composite laminate having at least a first, a second and a third layer, said first layer having a surface which faces towards said second and third layers and which has diffraction structures which are in the form of microscopically fine relief structures, wherein:

a) said first, second and third layers have optical refractive indices n3, n4 and n5 respectively, b) said refractive indices n3, n4 and n5 are substantially real over large parts of the visible range $\Gamma$ of the electromagnetic spectrum whereby said first, second and third layers are transparent, c) said refractive indices n3 and n4 are approximately equal in the visible range $\Gamma$ so that no diffraction occurs at a common interface of said first and second layers, d) said second layer only partially covers said first layer to form layer structures, e) said third layer (5) covers over said layer structures in direct contact with said first and second layers, f) the absolute differences |n5−n3| and |n5−n4| of said refractive indices in said visible range $\Gamma$ are at most 0.2 so that said diffraction structures remain as far as possible concealed from the human eye, g) at least parts of said diffraction structures are oriented in the same manner, and h) the absolute difference |n5−n3| in a second predetermined spectral range $\Lambda$ is at least 0.1 so that, in an operation of reading the information carrier by means of a reading light beam in the spectral range $\Lambda$, said layer structures, according to the presence or absence of said second layer, produce no diffraction or diffraction respectively at said diffraction structures.

A further aspect of the invention provides an information carrier in the form of a composite laminate having a first layer and at least one further layer, said first layer having a surface which faces towards said further layer and which has first diffraction structures which are in the form of microscopically fine relief structures and which, by diffraction of incident light, produce a visually verifiable authenticity feature, wherein:

a) said first and further layers have optical refractive indices n3 and n5 respectively, b) said further layer is approximately transparent, c) the absolute difference |n5−n3| over a large part of the visible range Γ of the electromagnetic spectrum is greater than 0.2 so that said first diffraction structures produce visible diffraction effects, d) said surface of said first layer has second surface elements with a second diffraction structure, said second surface elements being separated by first surface elements with said first diffraction structures, and e) said further layer can be provided with layer structures by a procedure whereby the refractive index n5, in a predetermined spectral range Λ, is locally altered by local doping with a foreign substance without said layer structures formed by the pattern of the unaltered and the altered locations being perceptible by the naked human eye and so that said layer structures, in an operation of reading the information contained therein by means of a reading light beam operating in the spectral range Λ, produce a measurable intensity modulation of the reading light beam which is diffracted at said second surface elements with said second diffraction structure.

Yet a further aspect of the invention provides an information carrier in the form of a composite laminate having a first layer and at least one further layer, said first layer having a surface which faces towards said further layer and which has first diffraction structures which are in the form of microscopically fine relief structures and which, by diffraction of incident light, produce a visually verifiable authenticity feature, wherein:

a) said first and further layers have optical refractive indices n3 and n5 respectively, b) one of said first and further layers is doped with a dye, c) said further layer is approximately transparent, d) the absolute difference |n5−n3| over a large part of the visible range Γ of the electromagnetic spectrum is greater than 0.2 so that said first diffraction structures produce visible diffraction effects, e) said surface of said first layer has second surface elements with a second diffraction structure, said second surface elements being separated by first surface elements with said first diffraction structures, and f) said layer doped with a dye, by local heating above a limit temperature specific to said dye, can be irreversibly provided with layer structures, wherein the refractive index of said doped layer is locally altered at the heated locations in a predetermined spectral range Λ without said layer structures formed by the pattern of the unaltered and the altered locations being perceptible by the naked human eye and so that said layer structures, in an operation of reading the information contained therein by means of a reading light beam operating in said predetermined spectral range Λ, produce a measurable intensity modulation of the reading light beam which is diffracted at said second surface elements with said second diffraction structure.

The invention also provides reading and/or writing devices for such information carriers and a process for producing information carriers.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
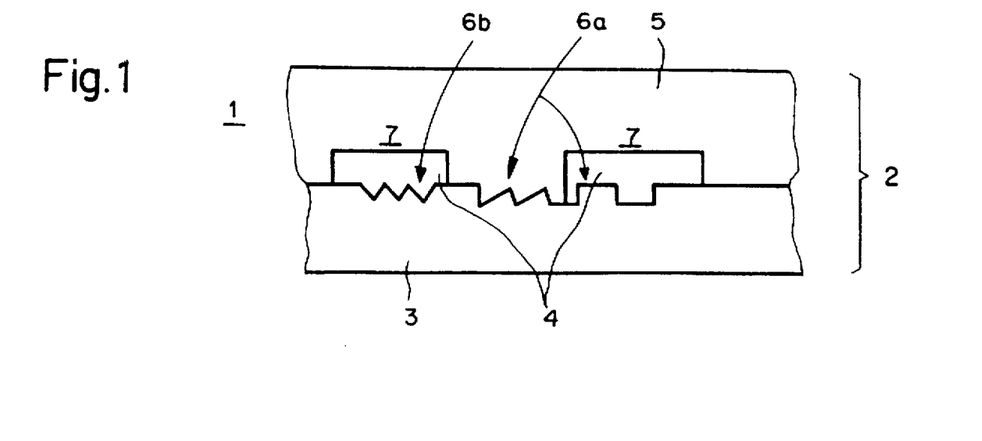
FIG. 1 is a view in cross-section of a first information carrier.

FIG. 1 shows a view in cross-section of an information carrier 1 which is in the form of a composite laminate 2. In a first embodiment the composite laminate 2 is formed by first, second and third layers 3, 4 and 5 respectively. The first layer 3 is a lacquer layer which, on the surface towards the second and third layers 4 and 5, has microscopically fine relief structures. On that surface of the layer 3 the second layer 4 forms structures 7 (layer structures) by virtue of the fact that it only partially covers the layer 3. The third layer 5 extends in the form of a layer over the full surface area, corresponding to the structures 7 of the second layer 4, either in direct contact over the first layer 3 or the second layer 4. The relief structures serve as first diffraction structures 6a for producing an optical security feature and as a second diffraction structure 6b for machine-readability of the structures 7. The three layers 3, 4 and 5 form the composite laminate 2 which can scarcely be detached in a destruction-free manner so that items of information which are present in the form of the diffraction structure 6b and the structures 7 are embedded in a forgery-proof manner.

The relief structures have a number of lines which is in the range of between 10 and 4,000 lines per millimeter. Their profile shape is typically 50 nanometers to 1 micrometer. They may be of any profile shape, for example sinusoidal, triangular, sawtooth or rectangular, etc.

The materials used for the three layers 3, 4 and 5 can be optically characterized by an optical refractive index n3, n4 and n5 respectively. The refractive indices vary in dependence on the light wavelength λ and may also assume complex values. The luminous power of the diffraction structures 6a depends on the difference of the refractive indices at the interfaces of the layers (3, 4; 3, 5) which directly embed the diffraction structures 6a. The layers 3, 4 and 5 are for exemple lacquer layers or thin film layers which consist of different materials like plastic materials, dielectrica, anorganic compounds, semiconductors, metals, etc. or contain some of these materials. A selection of suitable materials with information about their refractive index are to be found in EP 201 323. Examples of suitable materials include Polyvinyl naphthalene or Polyimide foil for layer 3, Polycarbonate for layer 4, and PMMA (polymethylmethacrylate) for layer 5.

The third layer 5 is advantageously an adhesive layer so that the information carrier 1 can be directly connected to the surface (not shown here) of a base card, a banknote, a document or the like. In this case the layer 3 is the side of the information carrier which is towards a person viewing it.

The composite laminate 2 however may conversely also be applied to the article to be protected, by the layer 3 being joined to the document.

Known technologies for producing the composite laminate 2 with the microscopically fine relief structures are for example the process which is described in Swiss patent specification No. 661 683 and in which the relief structures are embossed into a lacquer layer of thermoplastic material, the process which is described in U.S. Pat. Nos. 4,758,296 and 4,840,757 and in which the relief structures are produced by shaping in UV-hardenable lacquer, or the injection molding process which is known from Compact Disks.

Figure 2:
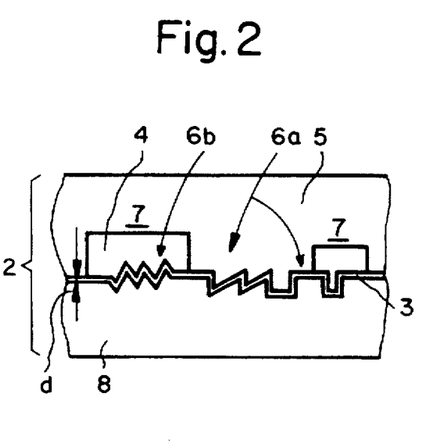
FIG. 2 is a view in cross-section of a second information carrier.

In a second embodiment of the composite laminate 2, as is shown in FIG. 2, the first layer 3 with the microscopically fine relief structures is a layer comprising an optically strongly reflective material which is applied to a fourth layer 8. If the layer 3 is a metallic layer and therefore has a refractive index with an imaginary part which is large over large parts of the visible $\Gamma$ of the electromagnetic spectrum, then the thickness d of the layer 3 is either selected to be sufficiently small, preferably of the order of magnitude of a few nanometers, so that on the one hand it is partially transmissive in respect of light in the spectral range $\Gamma$, and on the other hand the optical effects of the diffraction structures 6a are visually clearly perceptible, or it is so great, for example about 100 nm, that it becomes opaque. With an increasing thickness d of the layer 3, the reflectivity for visible light and therewith the visual impression to be produced by the diffraction structures 6a increases, that is to say the luminous power of the optical effect produced by the diffraction structures 6a can be controlled by the thickness d adopted. The layer 3 may however also afford a high level of reflectivity if its refractive index n3 has a large real part.

Selected examples of materials of the layer 3 in this case are Si, $TiO_2$ or Al.

In accordance with a first embodiment of the invention the information carrier 1 is of the layer structure shown in FIG. 1. The purpose of the first diffraction structures 6a lies in producing optical-diffraction effects which are well visible. The first diffraction structures 6a may be of any desired configuration. The function of the second diffraction structure 6b is to make the information contained in the structures 7 easily machine-readable and at the same time difficult to forge. The second diffraction structure 6b therefore involves a predetermined orientation in relation to a reference direction in the plane of the information carrier 1.

The refractive indices n3, n4 and n5 of the three layers 3, 4 and 5 respectively therefore fulfil at least approximately the following three conditions, namely that firstly the refractive indices n4 and n5 are of substantially real values over large parts of the visible range $\Gamma$ of the electromagnetic spectrum and therefore the layers 4 and 5 are approximately transparent, that secondly in the visible range $\Gamma$ the differences between the refractive index of the first layer 3 and the refractive indices of the other layers 4 and 5 are as large as possible, preferably more than 0.5 but at least 0.2: |n4−n3|, |n5−n3|≧0.2 for $\lambda\epsilon\Gamma$, so that the first diffraction structures 6a produce clearly visible diffraction effects, independently of the structures 7, even with diffuse lighting. Thirdly, the difference of the refractive indices of the second and third layers 4 and 5 respectively in a predetermined spectral range $\Gamma$ is at least 0.1: |n5−n4|≧0.1 for $\lambda\epsilon\Lambda$, so that the structures 7, upon reading of the information contained in same by means of a reading light beam which is in the spectral range $\Lambda$, produce a measurable change in the reading light beam which is diffracted at the second diffraction structure 6b. The visible spectral range $\Gamma$ of the light extends from 390 nm to 760 nm.

The first two conditions do not have to be strictly fulfilled in the region of the lower and also the upper visibility limit: what is important is good visibility of the optical effects which are produced by the diffraction structures 6a. The spectral range $\Lambda$ preferably corresponds to the light range of a commercially available semiconductor diode which for example emits approximately monochromatic light of a wavelength of 780 nm.

If a human observer views the information carrier 1 from a viewing direction into which the first diffraction structures 6a diffract little or no light, then, through the composite laminate 2 formed from the transparent layers 3, 4 and 5, he possibly sees the printed surface of a document provided with the information carrier 1. If however the viewer views the information carrier 1 from a direction into which the diffraction structures 6a diffract a great deal of light, then he sees the diffraction structures 6a in the form of colored surfaces, lines, dots etc., depending on the surface they occupy. By virtue of the slight difference in the refractive indices n4 and n5 in the visible range $\Gamma$ however the structures 7 cannot be discerned by the naked eye of the viewer, but they are in fact machine-readable. Machine reading by means of a reading light beam 20 (FIG. 5) can in principle be effected both from the side of the third layer 5 and from the side of the first layer 3. As a result of the change, which is predetermined by the structures 7, in respect of the refractive index differences at the interfaces between the first layer 3 and the second layer 4 or 5 respectively, the reading light beam 20 which is diffracted at the second diffraction structure 6b is modulated in respect of its intensity. So that the information can be correctly read out, the layer 4 forming the structures 7 must cover the diffraction structure 6b in direct contact. It is not possible for the machine-readable information to be expanded or altered by subsequent addition of a further structured layer, for example on the surface of the information carrier 1.

If the information carrier 1 is of a structure as shown in FIG. 2, the properties and the thickness d of the layer 3 determine whether and how it is transparent. If the difference of two refracting indices yields a complex value, then the absolute difference has to be considered as the modulus of the complex value.

Figure 3:
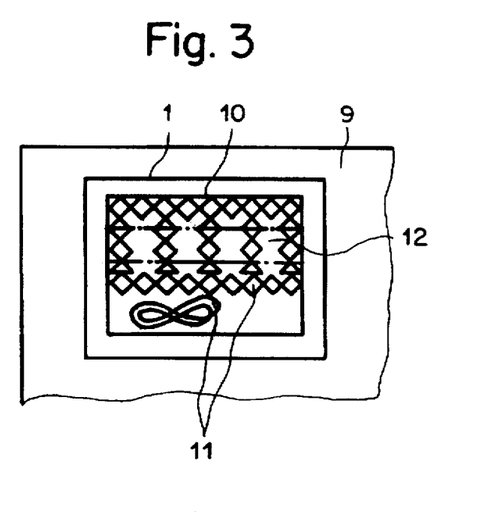
FIG. 3 is a plan view of the information carrier.

FIG. 3 now shows a document 9 provided with such an information carrier 1. Within a bordered area 10, patterns 11 are visible to the human eye in very widely varying shapes and colors.

The patterns 11 include first diffraction structures 6a (FIG. 1) which determine their optical effect. The geometrical parameters of line spacing, orientation and profile shape which characterize the diffraction structures 6a in relief form vary locally within the area 10 in a predetermined manner in such a way that, when the information carrier 1 is viewed and moved under normal lighting conditions, the patterns 11 show conspicuous changing optical effects such as for example changing brightness or color. Adjacent patterns 11 may also appear alternately reflectingly light or dark or may appear matt on surfaces which are light or dark depending on the respective lighting and viewing direction. The diffraction structures 6a may in particular produce the changing optical effects as are known from holograms or in the form of optical variable graphics from EP 105 099. The optical effects of the patterns 11 represent a security feature which can be easily checked visually but which is difficult to forge.

The area 10 has at least one data track 12 for carrying the concealed machine-readable information. The contour of the data track 12 is shown in the drawing by dash-dotted lines.

The data track 12 as such is inconspicuous and is scarcely perceptible to the human eye.

Figure 4:
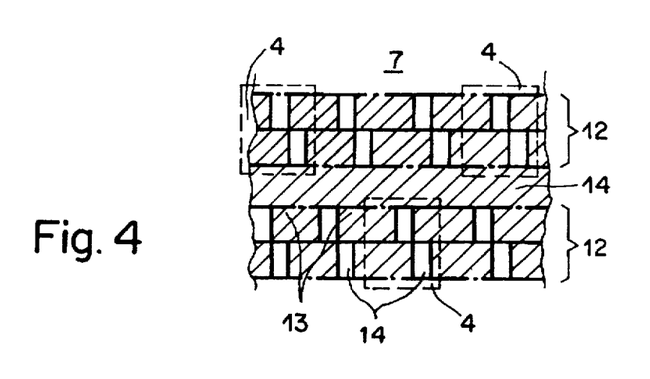
FIG. 4 shows a portion of a data track.

FIG. 4 is a view on an enlarged scale of a portion of the information carrier 1 (FIG. 3) with two parallel data tracks 12, as a plan view. In the region of the data tracks 12 the patterns 11 (FIG. 3) have first and second surface elements 13 and 14 respectively which are arranged in alternate succession in for example two tracks. The tracks are displaced relative to each other by a surface element 14 and are for example 0.3 mm in width.

The first surface elements 13 contain the first diffraction structures 6a (FIG. 1) which can be of any configuration, for producing visually dominant optical effects of the previously described kind. The first surface elements 13 can further be subdivided into a predetermined number of surface portions, wherein each surface portion, as described in European patent specification EP 375 833, contributes to an image which is visible from another viewing angle. Some of the first surface elements 13 can also be for example in the form of diffusely scattering or reflecting surfaces. The diameter of the reading light beam of a reading device is approximately as wide as the data track 12, for example 0.5 mm.

The second surface elements 14 contain the second diffraction structure 6b. As the second diffraction structure 6b which is contained in the second surface elements 14 is oriented in the same way in relation to any reference direction in all surface elements 14, the surface elements 14 diffract the reading light beam of the reading device, which is incident thereon in a predetermined direction, in the form of beam portions in predetermined directions. The geometrical dimensions of the second surface elements 14 are preferably less than 0.3 mm so that they can be perceived by the naked eye at a typical reading distance of 30 cm, at most as structure-less dots.

To form the concealed information the second layer 4 is structured in the region of the data track 12, the dimensions of the structures 7 in the direction which is predetermined by the data track 12 being greater than the dimensions of the second surface elements 14 so that, when the data track 12 is read out by machine, the structures 7 produce easily perceptible modulation of the levels of intensity of the diffracted beam portions. The ratio of the area occupied by the surface elements 13 relative to the area occupied by the surface elements 14 is so predetermined that on the one hand there is the visual impression which is produced by the image-forming surface elements 13, and on the other hand machine-readability of the information contained in the surface elements 14 and the structures 7 is guaranteed. How and whether the data track 12 is subdivided for that purpose, for example as described into two or more tracks or otherwise, is not crucial. Thus there is also no need for the surface elements 13 and 14 to be arranged at regular distances. The structures 7 form for example a bar code.

Figure 5:
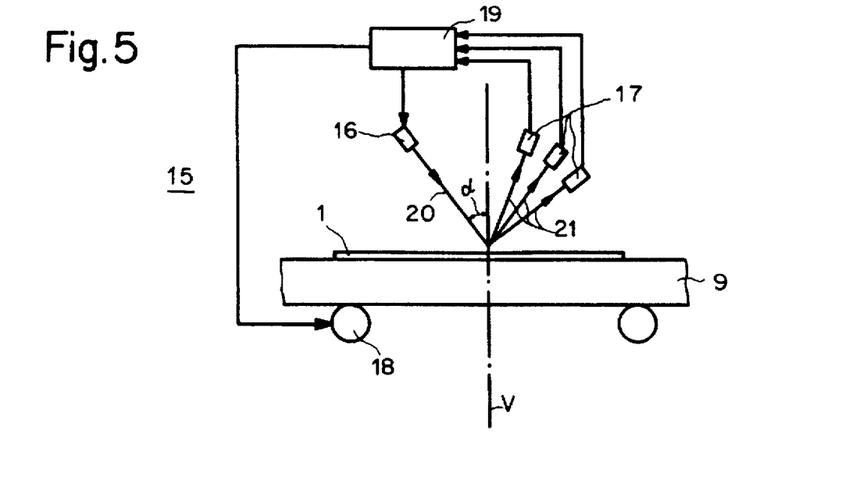
FIG. 5 shows a reading device for reading the information contained in the information carrier.

FIG. 5 shows a reading device 15 which includes a light source 16, photodetectors 17, a transport device 18 and a control and evaluation circuit 19. A reading light beam 20 emitted by the light source 16 is incident onto the data track 12 (FIG. 3) of the information carrier 1 inclinedly at an angle of incidence α. The photodetectors 17 are suitably arranged in the reading device 15 for measuring the levels of intensity of the beam portions 21 which are diffracted into the predetermined diffraction orders by the second surface elements 14 with the second diffraction structure 6b (FIG. 1). The transport device 18 serves for relative displacement between the reading light beam 20 and the document 9 along the data track 12. In the operation of reading out the data track 12, the control and evaluation circuit 19 controls that relative movement and at the same time detects the levels of intensity of the beam portions 21 and ascertains therefrom the information stored in the data track 12.

In accordance with a second embodiment of the invention the materials used for the layers 3, 4 and 5 (FIG. 1) satisfy the conditions that firstly in the visible range $\Gamma$ the second layer 4 at least approximately has the same refractive index as the first layer 3: $n3 \equiv n4$, that secondly in the visible range $\Gamma$ the difference between the refractive index n3 of the first layer 3 and the refractive index n5 of the third layer 5 is at most 0.2 and preferably at most 0.1: $|n5-n3|<0.2$ for $\lambda \epsilon \Gamma$, and that thirdly in the spectral range $\Lambda$ of the optical reading device 15 (FIG. 5), that difference is at least 0.1: $|n5-n3| \geq 0.1$ for $\lambda \epsilon \Gamma$. Fourthly the refractive indices n3, n4 and n5 are substantially real. For that reason and because of the slight differences in the refractive indices n3, n4 and n5 in the visible range $\Gamma$ the area 10 (FIG. 3) appears to a human observer as transparent and structure-less. First diffraction structures 6a are not present and the second diffraction structures 6b which preferably cover over the entire surface of the first layer 3 produce no or at most poorly visible diffraction effects. The second layer 4 is again structured for example as a bar code along the data track 12. Wherever the second layer 4 is missing, the reading light beam 20 of the reading device 15 is diffracted as beam portions 21 into predetermined directions at the second diffraction structure 6b. Wherever the second layer 4 is present, the reading light beam 20 is not diffracted, but at most partially reflected. Accordingly, in the case of such an information carrier, the viewer looks through the area 10 onto the surface of the protective article and scarcely comes to the assumption that the concealed information could be stored.

One example of the materials for the layers in this case are polycarbonate for layer 3, polystyrene for layer 4 and PMMA for layer 5.

When using gratings with an asymmetrical profile for the second diffraction structure 6b, more light is diffracted into the positive diffraction orders than the negative diffraction orders. In such a situation the reading device 15 is designed to analyse the intensities of the different beam portions 21 and in particular the ratios thereof. In that way it is possible to carry out a machine authenticity check on the basis of physical properties of the second diffraction structure 6b.

The document 9 can be a value-bearing paper, in particular a banknote. In that case the reading device 15 is designed automatically to leaf through an entire bundle or stack of banknotes and to read each banknote individually and to subject to further processing the items of information which are read out of the structures 7, such as for example the number of the banknote, the type of banknote, etc. Further means are provided for sorting out or rejecting banknotes which do not go through the authenticity check.

Both embodiments of the invention permit the identification of documents, in particular banknotes, by means of an individualized information carrier. The identification which for example can be a serial number can be visible to the human eye or it can be concealed. The proposed structure of the composite laminate gives a high level of safeguard against forgery as the information stored in the structures of the second layer is embedded between two layers and is therefore not accessible and possibly even joined to a visually perceptible authenticity feature in such a way that it cannot be separated without involving destruction. The information can be additionally present on the document in another form, for example printed in the usual way.

Individualization of the information carrier 1 is effected for example by a procedure whereby the second layer 4 is applied by means of an ink jet printer. In that procedure the ink jet printer is controlled by a computer in such a way that the structured layer 4 is produced.

Described hereinafter are still further embodiments of the information carrier 1 which can be produced by particular technologies. In a particularly advantageous configuration of the information carrier 1 which has a layer structure as is shown in FIGS. 1 or 2, the layer 4 forming the structures 7 and the third layer 5 comprise the same basic material but the layer 4 is additionally doped with a foreign substance, for example a dye. The dye has a high level of absorption in the wavelength range $\Lambda$ in which the operation of reading out by machine the information contained in the structures 7 is effected. The imaginary part of the refractive index n4 of the layer 4 is altered by the addition of such a dye. The reading-out operation using the reading light beam 20 is effected from the side of the layer 5. The levels of intensity of the light beam portions 21 which are diffracted at the diffraction structure 6b (FIG. 5) now depend on whether the reading light beam 20, in the operation of reading the data track 12, impinges through the third layer 5 directly onto the diffraction structure 6b or whether the reading light beam 20 impinges on the diffraction structure 6b through the third layer 5 and through the second layer 4. In the latter case because of the absorption effect the reading light beam 20 and the beam portions 21 experience an attenuation effect or even practically complete disappearance of their intensity. The information contained in the structures 7 can thus be determined on the basis of modulation of the levels of intensity of the beam portions 21 in the reading-out operation, by the control and evaluation circuit 19. The layers 4 and 5 are practically inseparably joined as, except for the dye, they consist of the same material, preferably a plastic material which can be processed in the form of a lacquer. In the visible wavelength range $\Gamma$ the dye, even after the change, exhibits a low degree of or vanishing absorption so that the visual impression produced by the first diffraction structures 6a is little adversely affected by the dye or is not at all adversely affected thereby. It is also possible to use a dye which has a high absorption constant in a relatively narrow-band range $\Phi$ of the visible spectrum $\Gamma$. The spectral range $\Lambda$ of the reading light beam 20 then has to be matched to the range $\Phi$ and is then also within the visible spectrum $\Gamma$. If the structures 7 are of a sufficiently fine nature they cannot nonetheless be recognised by the naked human eye. In the worst case there is a change in color in the entire written data track 12. Example of such dyes are fluorescein from Kodak or Leukophor® from Bayer.

It is also possible that the real part of the refractive index n4 is varied by the addition of a foreign substance to the layer 4, more specifically as a result of a change in density of the layer 4. In this case also modulation of the levels of intensity of the diffracted beam portions 21 is effected by the structures 7 in the reading operation by means of the laser light beam 20 and that modulation can be evaluated by the control and evaluation unit 19.

In a first process for producing such an information carrier 1 with such a dye, a liquid lacquer which contains the dye in the form of dissolved particles is applied using a known printing procedure in the form of a structured layer 4 to the layer 3 in which the diffraction structures 6a and 6b were previously produced for example by embossing, shaping or molding. After the drying and/or hardening operation the layer 5 is applied. The use of UV-hardenable lacquer affords a production process which is particularly economical in terms of time.

Figure 6A:
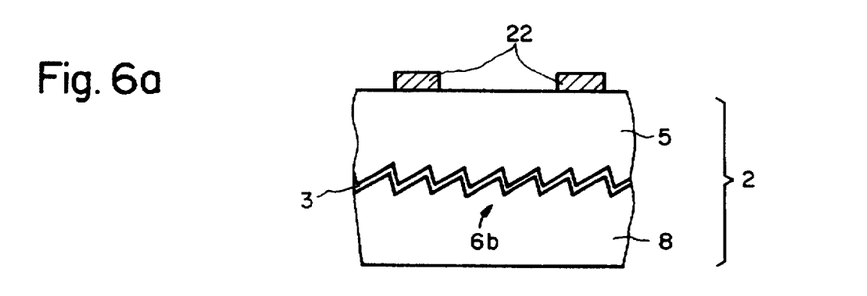
FIGS. 6a, 6b and 6c show a process for producing the information carrier.
Figure 6B:
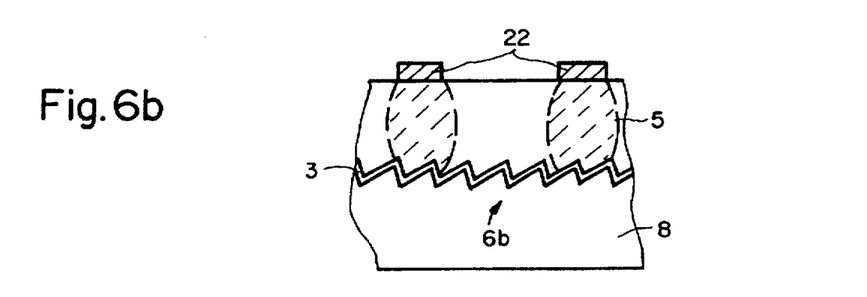
Figure 6C:
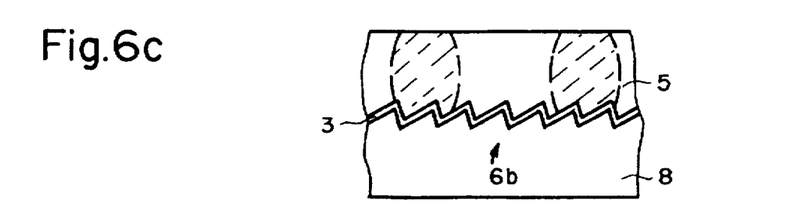

In a second process which is shown in FIGS. 6a, 6b and 6c, firstly a composite laminate 2 is produced comprising at least a first layer 3 and a lacquer layer 5. If the first layer 3 is a strongly reflective layer, then the layer 3 is advantageously embedded between the lacquer layer 5 and a further layer 8. The foreign substance is then in turn applied in the form of a structured layer 22 using a known process (FIG. 6a). In a next step the composite laminate 2 is exposed for a predetermined period of time to an elevated temperature which is still below the softening point of the lacquer layers 3 and 5 and which is for example 100° C. so that the foreign substance partially diffuses into the layer 5 (FIG. 6b). The period of time adopted is preferably of such a length that the foreign substance diffuses into the layer 3 as far as the diffraction structures 6b or also still somewhat further. It is however also possible for the desired information to be written as structures 7, and read out optically, without the foreign substance diffusing as far as the layer 3. If necessary at the end the layer 22 is removed again (FIG. 6c). In this case the operation of reading the information by machine is also effected from the side of the lacquer layer 5.

The second process is suitable for individualizing the information carrier 1 by means of a small device which comprises a writing device for applying the layer 22 to the composite laminate 2, for example an ink jet printer or a laser printer, and a small heating device. In that case the information carrier 1 can already be applied prior to the individualization procedure to a document such as for example an identity card or a security paper.

In a third process for producing such an information carrier 1, a lacquer which contains the dye in the form of dissolved particles is applied using a known process, in the form of an unstructured layer 5, to the layer 3 in which the diffraction structures 6a and 6b were previously produced for example by embossing, shaping or molding. Structures 7 (layer structures) are only formed in the step of individualizing the information carrier 1 by a procedure wherein, by virtue of local heating above a limit temperature which is specific to the dye, the dye, at the heated location, produces a locally irreversible change from a transparent substance into a substance which is absorbent for the light for reading out the information. The locally altered locations and the unaltered locations together form the structures 7. For example the lacquer layer 5 is completely transparent before the information is written in. After the information has been written in the lacquer layer 5 is opaque at the locally altered locations, in relation to the light for reading out the information. For the reading device 15, the change in transparency has the same effect as if the diffraction structure 6b had been converted into a matt structure. Such dyes which have a thermochromatic behaviour are known for example from U.S. Pat. Nos. 2,663,654 and 3,682,684 and EP 277 032. An advantage of that process is that, in the event of correct metering of the amount of heat energy supplied, the surface of the layers 3, 5 remains intact.

If the difference in the refractive indices n3 and n5 of the two layers 3 and 5 determines the optical property of the diffraction structures 6a, then the incorporation of the thermochromatic dye in the lacquer layer 5 or in the layer 3 if the layer 3 is also a lacquer layer, makes it possible to produce an irreversible change once in the corresponding refractive index in the writing-in operation. When reading out the information the intensity of the amount of light deflected into the photodetector 17 by diffraction effects is dependent on whether the dye has been changed at the local location by the heating effect and the difference in the refractive indices n3 and n5 is locally altered.

The reading device 15 can read the information out of the structures 7 which are formed as patterns in the irreversibly altered locations against the background of the remaining unaltered layer 3 or 5 respectively. As, for reading the information, the reading device 15 only receives the light which is diffracted at the diffraction structure 6b or detects the absence thereof, these information carriers have the advantage that they can admittedly be written to once, but they can only be imitated or forged at high cost. The diffraction structures 6a and the absence of damage to the surface also permit a lay person to visually check the authenticity of the information carrier 1.

Local heating of the dye can be effected for example by irradiation with intensive light. The light beam of a write/reading device advantageously not only has a higher level of intensity in the writing operation than the light for the reading-out operation, but the writing operation is effected with light whose intensity maximum is in a different wavelength range. For example, in the reading operation, the second diffraction structure 6b is irradiated with infra-red light whereas a light beam with another wavelength which is suited to the dye is used for the writing-in operation.

A document provided with an information carrier which comprises at least the two layers 3 and 5, wherein one of the two layers 3 and 5 is doped with a dye, is particularly suitable for uses in which the information is to be written in decentrally. Such uses are for example passes of any kind or also an optical money purse in which the current amount of money is continuously written along the data track (FIG. 3) or in a two-dimensional data field. Any money transferred to or from the money purse is effected by a writing/reading device, the number of possible transactions being predetermined by the number of optically writable bits.

Instead of or in addition to the data track 12 the area 10 shown in FIG. 3 may contain a two-dimensional data area, in which case any xy-data point of the data area can be addressed in the reading-out operation by means of the reading device. Such a data area in turn contains first and second surface elements 13 and 14 respectively. In the simplest embodiment the surface elements 14 which serve to represent the machine-readable information only contain the diffraction structure 6b which is in the form of a grating involving a predetermined line spacing, a predetermined orientation and a predetermined profile form so that it diffracts the light of the reading light beam in predetermined directions. In a further embodiment the second surface elements 14 are subdivided into sub-elements. The sub-elements each contain a different respective diffraction structure 6b which diffracts the light of the reading light beam in different directions. The structuring of the second layer 4 for forming the machine-readable information can then be such that of for example two sub-elements of a surface element 14, only the respective one is covered with the layer 4.

To achieve a high diffraction efficiency the diffraction structures 6b are preferably in the form of a two-dimensional grating which is characterized by a constant line spacing and a predetermined profile shape. It is however also possible to provide a set having a number of predetermined diffraction structures 6b which do not diffract the light in a few selected directions but which diffract the light in predetermined three-dimensional angle ranges. In such a case the associated reading device, instead of individual photodetectors, preferably has a one-dimensional or two-dimensional array of photodetectors, for example a CCD-Sensor. The intensity distribution of the light diffracted into a predetermined three-dimensional angle range can be measured with such a CCD-Sensor.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An information carrier in the form of a composite laminate having at least a first, a second and a third layer, said first layer having a surface which faces towards said second and third layers and which has first diffraction structures which are in the form of microscopically fine relief structures and which, by diffraction of incident light, produce a visually verifiable authenticity feature, wherein:

a. said first, second and third layers have optical refractive indices $n3$, $n4$ and $n5$ respectively, b. said refractive indices $n4$ and $n5$ are substantially real over large parts of the visible range $\Gamma$ of the electromagnetic spectrum whereby said second and third layers are transparent, c. said second layer only partially covers said first layer to form layer structures, d. said third layer covers said layer structures in direct contact with said first and second layers, e. the absolute differences $|n4-n3|$ and $|n5-n3|$ over large parts of said visible range $\Gamma$ are greater than 0.2 so that said first diffraction structures produce visible diffraction effects independently of said layer structures, f. the differences $n4-n3$ and $n5-n3$ over large parts of the visible range $\Gamma$ are of approximately equal magnitude so that said layer structures remain concealed from the human eye, g. said surface of said first layer has first surface elements with said first diffraction structures, said first surface elements being separated by second surface elements with a second diffraction structure, and h. the absolute difference $|n5-n4|$ in a second predetermined spectral range $\Lambda$ is at least 0.1 so that, in an operation of reading the information carrier by means of a reading light beam in the spectral range $\Lambda$, said layer structures produce a measurable change in the reading light beam which is diffracted at said second surface elements with said second diffraction structure.

2. An information carrier according to claim 1 wherein said second layer is doped with a foreign substance which has a high absorption constant in said second predetermined spectral range $\Lambda$.

3. An information carrier according to claim 2 wherein said foreign substance is a dye.

4. An information carrier according to claim 2 wherein said second predetermined spectral range $\Lambda$ includes at most only a relatively narrow-band range of said visible range $\Gamma$, so that the visually perceptible impression of the information carrier is not adversely affected by said foreign substance.

5. An information carrier according to claim 4, wherein said second predetermined spectral range $\Lambda$ lies outside said visible range $\Gamma$.

6. An information carrier according to claim 1 wherein the dimensions of said second surface elements are at most 0.3 mm.

7. An information carrier according to claim 1 wherein said second diffraction structures have an asymmetrical profile which can be checked as an authenticity feature.

8. An information carrier in the form of a composite laminate having at least a first, a second and a third layer, said first layer having a surface which faces towards said second and third layers and which has diffraction structures which are in the form of microscopically fine relief structures, wherein:

a) said first, second and third layers have optical refractive indices n3, n4 and n5 respectively, b) said refractive indices n3, n4 and n5 are substantially real over large parts of the visible range Γ of the electromagnetic spectrum whereby said first, second and third layers are transparent, c) said refractive indices n3 and n4 are approximately equal in the visible range Γ so that no diffraction occurs at a common interface of said first and second layers, d) said second layer only partially covers said first layer to form layer structures, e) said third layer (5) covers over said layer structures in direct contact with said first and second layers, f) the absolute differences |n5−n3| and |n5−n4| of said refractive indices in said visible range Γ are at most 0.2 so that said diffraction structures remain as far as possible concealed from the human eye, g) at least parts of said diffraction structures are oriented in the same manner, and h) the absolute difference |n5−n3| in a second predetermined spectral range Λ is at least 0.1 so that, in an operation of reading the information carrier by means of a reading light beam in the spectral range Λ, said layer structures, according to the presence or absence of said second layer, produce no diffraction or diffraction respectively at said diffraction structures.

9. An information carrier according to claim 8 wherein said second layer is doped with a foreign substance which has a high absorption constant in said second predetermined spectral range Λ.

10. An information carrier according to claim 9 wherein said foreign substance is a dye.

11. An information carrier according to claim 9 wherein said second predetermined spectral range Λ includes at most only a relatively narrow-band range of said visible range Γ, so that the visually perceptible impression of the information carrier is not adversely affected by the foreign substance.

12. An information carrier according to claim 11, wherein said second predetermined spectral range Λ lies outside said visible range Γ.

13. An information carrier according to claim 8 wherein said diffraction structures have an asymmetrical profile which can be checked as an authenticity feature.

14. A reading device for an information carrier according to claim 8, said reading device including a light source for producing a reading light beam and a plurality of photodetectors, wherein said photodetectors are arranged to detect the light of said reading light beam which is diffracted at said diffraction structure and said reading device being operable for checking the authenticity of said information carrier on the basis of the levels of intensity measured by different said photodetectors.

15. An information carrier in the form of a composite laminate having a first layer and at least one further layer, said first layer having a surface which faces towards said further layer and which has first diffraction structures which are in the form of microscopically fine relief structures and which, by diffraction of incident light, produce a visually verifiable authenticity feature, wherein:

a. said first and further layers have optical refractive indices n3 and n5 respectively, b. said further layer is approximately transparent, c. the absolute difference |n5−n3| over a large part of the visible range Γ of the electromagnetic spectrum is greater than 0.2 so that said first diffraction structures produce visible diffraction effects, d. said surface of said first layer has first surface elements with said first diffraction structures, said first surface elements being separated by second surface elements with a second diffraction structure, and e. said further layer is configured to be provided with layer structures by a procedure whereby the refractive index n5, in a predetermined spectral range Λ, is locally altered by local doping with a foreign substance without said layer structures formed by the pattern of the unaltered and the altered locations being perceptible by the naked human eye and so that said layer structures, in an operation of reading the information contained therein by means of a reading light beam operating in the spectral range Λ, produce a measurable intensity modulation of the reading light beam which is diffracted at said second surface elements with said second diffraction structure.

16. An information carrier according to claim 15 wherein the dimensions of said second surface elements are at most 0.3 mm.

17. An information carrier according to claim 15 wherein said second diffraction structures have an asymmetrical profile which can be checked as an authenticity feature.

18. A process for producing an information carrier according to claim 15, the process comprising the steps of:

a) producing a composite laminate comprising at least a first and a further layer, b) applying a foreign substance as a structured layer to said further layer of said composite laminate, and c) heating the information carrier for a predetermined period of time to a predetermined temperature which is below the softening point of said layers so that said foreign substance partially diffuses into said further layer.

19. A process according to claim 18, wherein in said step of producing said composite laminate, a strongly reflective layer is embedded between said first and further layers.

20. A process according to claim 19 including removing the remains of said structured layer after said heating step.

21. An information carrier in the form of a composite laminate having a first layer and at least one further layer, said first layer having a surface which faces towards said further layer and which has a first diffraction structures which are in the form of microscopically fine relief structures and which, by diffraction of incident light, produce a visually verifiable authenticity feature, wherein:

a. said first and further layers have optical refractive indices n3 and n5 respectively, b. one of said first and further layers is doped with a dye, c. said further layer is approximately transparent, d. the absolute difference |n5−n3| over a large part of the visible range Γ of the electromagnetic spectrum is greater and 0.2 so that said first diffraction structures produce visible diffraction effects, e. said surface of said first layer has first surface elements with said first diffraction structures, said first surface elements being separated by second surface elements with a second diffraction structure, and f. said layer doped with a dye is configured to be irreversibly provided with layer structures by local heating above a limit temperature specific to said dye, wherein the refractive index of said doped layer is locally altered at the heated locations in a predetermined spectral range $\Gamma$ without said layer structures formed by the pattern of the unaltered and the altered locations being perceptible by the naked human eye and so that said layer structures, in an operation of reading the information contained therein by means of a reading light beam operating in said predetermined spectral range $\Lambda$, produce a measurable intensity modulation of the reading light beam which is diffracted at said second surface elements with said second diffraction structure.

22. An information carrier according to claim 21 wherein the dimensions of said second surface elements are at most 0.3 mm.

23. An information carrier according to claim 21 wherein said second diffraction structures have an asymmetrical profile which can be checked as an authenticity feature.

24. A document including an information carrier according to claim 1 or claim 8 or claim 15 or claim 21.

25. A document according to claim 24 wherein said document is one of: a credit card, a value card, a banknote, an identity card and a pass.

26. A reading device for an information carrier according to claim 1 or claim 15 or claim 21, said reading device including a light source for producing a reading light beam and a plurality of photodetectors, wherein said photodetectors are arranged to detect the light of said reading light beam which is diffracted at said second surface elements with said second diffraction structure and said reading device being operable for checking the authenticity of said information carrier on the basis of the levels of intensity measured by different said photodetectors.

27. A reading and/or writing device configured to receive an information carrier according to claim 21, the device being operable to effect local heating of said dye over said limit temperature specific to said dye.

* * * * *